United States Patent [19]

Faber et al.

[11] 4,006,217
[45] Feb. 1, 1977

[54] PROCESS FOR MAKING MANGANESE DIOXIDE

[75] Inventors: Peter Faber, Grosswelzheim, Germany; Jean Brenet, Strasbourg, France

[73] Assignee: Rheinisch-Westfallisches Elektrizitatswerk Aktiengesellschaft, Essen, Germany

[22] Filed: Apr. 23, 1975

[21] Appl. No.: 570,585

[30] Foreign Application Priority Data

Apr. 23, 1974 Germany .......................... 2419490

[52] U.S. Cl. .............................................. 423/605
[51] Int. Cl.$^2$ ..................................... C01G 45/02
[58] Field of Search .................... 423/605; 136/139

[56] References Cited

UNITED STATES PATENTS

| 1,330,738 | 2/1920 | Ellis et al. | 423/605 |
| 1,358,626 | 11/1920 | Ellis | 423/605 |
| 3,702,889 | 11/1972 | Goldman | 423/605 |

FOREIGN PATENTS OR APPLICATIONS 1,189,960   4/1965   Germany ........................ 423/605

OTHER PUBLICATIONS

Beleu et al., "Chemistry and Industry (London)", Nov. 18, 1967, pp. 1958–1959.
Smith, "Talanta", vol. 15, 1968, pp. 489–496.
Gmelin Band Sauerstoff, 8 Aufl., Lieferung 4, Seite 1181.

*Primary Examiner*—Herbert T. Carter
*Attorney, Agent, or Firm*—Karl F. Ross; Herbert Dubno

[57] ABSTRACT

Manganese dioxide is prepared from a manganese (III)-containing oxide by disproportionating the latter with a perhalo acid to yield both manganese dioxide and a solution containing manganese (II) ions, and, if desired, removing the manganese dioxide precipitate from the manganese (II) ion solution. The manganese (II) solution wherein the manganese exists as a manganese (II) perhalate can then be quantitatively oxidized to manganese dioxide by ozone.

7 Claims, No Drawings

PROCESS FOR MAKING MANGANESE DIOXIDE

FIELD OF THE INVENTION

This invention relates to the preparation of manganese dioxide. More particularly the invention relates to the preparation of manganese dioxide from a lower valence manganese oxide, especially manganese (III)-containing oxide.

BACKGROUND OF THE INVENTION

There are several processes known for the preparation of manganese dioxide. It is known that manganese (III) oxide will disproportionate to manganese dioxide and manganese (II) ion in the presence of acid. However, there are many competing side reactions involved which substantially interfere with the product yield. Also, any change in reaction conditions from prior art procedures has often drastically reduced the product yield. Therefore the disproportionation of Mn (III) has not often been relied upon in the synthesis of $MnO_2$. The process also has the disadvantage of high cost.

A second process involves the reaction of a soluble manganese (II) salt with base to precipitate manganese (II) hydroxide. The manganese (II) hydroxide is then oxidized in the art to form MnOOH where of course the manganese now has a valence of three. The MnOOH is then air-oxidized to manganese dioxide with water as a byproduct. This process has the disadvantages of being very time-consuming and being more costly than the first.

A third method of preparing manganese dioxide is by the thermal destruction of manganese (II) nitrate salt at a temperature of 350° C. However, this process has the disadvantage of producing beta-manganese dioxide which does not have sufficient depolarization strength for use in modern batteries.

In one prior art process described, for example, in French patents 1,306,706 and 1,525,333, the disproportionation of the trivalent manganese is carried out with sulfuric acid or the like. The trivalent manganese disproportionates, in the presence of the acid, to tetravalent manganese (i.e. manganese dioxide) and soluble divalent manganese. In this process it is possible to obtain a theoretic conversion of only 50% of the trivalent manganese (e.g. $Mn_2O_3$) to synthetic manganese dioxide.

The formula for the disproportionation reaction is represented as:

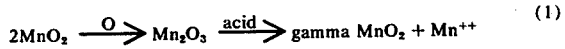
(1)

The yield is generally considered to be somewhat higher because of the inclusion of water molecules in the gamma structure. In this process a precise control of concentration and quantity of acid, of reaction temperature and treatment time is extremely important since otherwise reductive side reactions interfere with the disproportionation and with the value of the product. The processing when carried out properly, yields a manganese dioxide of a gamma structure as is particularly desirable for use in primary batteries.

A conventional process of another type (see LEHRBUCH FUR ANORGANISCHE CHEMIE, 80, Aufl., S. 817 ff.) precipitates the manganese-II-hydroxide from its manganese salt solution with alkali-metal hydroxide with oxidation by atmospheric oxygen first to the manganese oxide hydrate. The manganese oxide hydrate undergoes further oxidation and splitting of water at elevated temperature to the manganese dioxide. Oxidation with atmospheric oxygen occurs slowly. The reaction can be represented as:

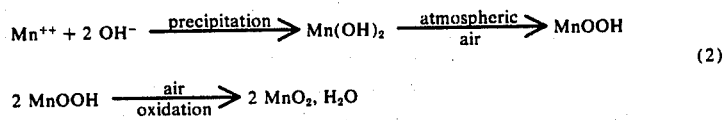
(2)

The last-mentioned process is more expensive than the first.

The third process for the recovery of synthetic manganese dioxide relies upon the thermal decomposition of $Mn(NO_3)_2$ salts which, when carried out at 350° C, yields manganese dioxide with a beta structure having little utility in batteries because it has pure depolarization capability.

OBJECTS OF THE INVENTION

It is an object of the invention to produce either alpha or gamma manganese dioxide at a yield higher than that of the prior art.

It is also an object of the invention to produce manganese dioxide by a process which is not sensitive to concentration, treatment time and treatment temperature.

It is another object of the invention to take advantage of the disproportionation of manganese (III)-containing oxides to recover the manganese dioxide so produced and to subsequently oxidize the manganese (II) compounds also formed by the disproportionation to then form additional manganese dioxide.

SUMMARY OF THE INVENTION

We have found, surprisingly, that when a manganese (III)-containing oxide is treated with an acid containing perhalo ions, that a high yield of either alpha- or gamma- manganese dioxide will form. By a manganese (III)-containing oxide we mean manganese oxide that must contain at least some $Mn_2O_3$ and or MnOOH, but which also may contain MnO, $Mn(OH)_2$, $Mn_3O_4$, manganite, groutite or manganoxyhexahydrate. The preferred acid which contains halo ions is perchloric acid especially at a concentration of from 10 to 40% by weight.

An additional feature of the invention involves taking advantage of the disproportionation of manganese (III) compounds in the presence of the acid containing the perhalo ions. The products of the disproportionation of manganese (III) oxide include both manganese dioxide and manganese (II) ion. If the disproportionation is carried out in an acid containing perhalo ions, and the manganese dioxide formed is precipitated out of the acid solution, we have found that by treating the remaining solution of Mn (II) ions and perhalo ions with ozone, the manganese (II) ion can be quantitatively oxidized to form additional manganese dioxide. The ozonation is preferably carried out at a temperature of between 50° and 80° C.

The invention also includes a slight modification of the above process. In the above process the ozonation step takes after the initial disproportionation in acid of the manganese (III) oxide. However, we have found that if the disproportionation of the Mn(III)-containing oxide in acid containing perhalo ion is carried out simultaneously with the ozonation, the same high yield of manganese dioxide will occur as mentioned in the preceding paragraph wherein the ozonation follows the disproportionation.

It is indeed surprising that the ozonation of the Mn(III) ion in the presence of perhalo ion yields a high amount of manganese dioxide (quantitative in fact). One would expect that the ozonation of manganese (II) ion in the presence of perhalo ions or not would substantially if not almost quantitatively be oxidized to permangenate ion with its distinctive purple color. However, no such color was observed. Instead a dark gray precipitate indicating manganese dioxide was the only result. Since ozone is a most powerful oxidizing agent, this result is certainly surprising.

While we prefer to use perchloric acid as our source of acid containing perhalo ions, perbromic and periodic acids or a mixture of any two or all three of these acids is also appropriate. Alternatively, we can add concentrated acid such as nitric acid along with an alkali metal or ammonium salt of a perhalo acid to thus produce an acid containing perhalo ions. Often this method of treating the manganese (III)-containing oxide is the safest and most practicable since concentrated perhalo acids are often difficult to handle. Since we are in effect making a perhalo acid in situ, we do not have the problem of handling a perhalo acid.

Yet another feature of our invention is our control over whether it is alpha-manganese dioxide or gamma-manganese dioxide that is produced. Our process, we may add, avoids the problem of producing beta-manganese dioxide which as stated hereinbefore is an undesirable phase. Thus far, if the method according to the summary of the invention is followed, it is the gamma-manganese dioxide which will form. However, if a cation with a greater ionic radius than Manganese (IV) is added to the acid solution containing perhalo ions, the manganese dioxide produced after the disproportionation and ozonation steps will be mostly in the alpha phase. Appropriate caions whose aqueous solution may be added include sodium, potassium, lithium and calcium. The amount of the cationic solution added to the acid perhalo solution should be about 0.5 to 5% by weight of the total solution.

We would also like to point out a collateral feature regarding the ozonation of the manganese (II) perhalo solution resulting from the disproportionation reaction discussed earlier. In addition to the manganese (II) ion already formed by the disproportionation, we can add additional manganese (II) ions in the form of a salt soluble in the acid perhalo solution. Any salt soluble therein may be added; however, we have had particular success with manganese (II) sulfate. As a result of adding the additional manganese of course, we obtain correspondingly more manganese dioxide.

Thus the invention resides in reacting the low-valence manganese oxide with a halogen peroxy acid, or several halogen peroxy acids, preferably with perchloric acid to form manganese dioxide and divalent manganese in the solution which, by simultaneous or subsequent oxidation with ozone, is also transformed into manganese dioxide. The manganese dioxide acid disproportionation reaction product can be removed from the solution before treatment with ozone or can remain during the ozone treatment. In either case the solution which is treated with ozone contains soluble divalent manganese.

A principal advantage of the present process is that it is not sensitive to acid concentrations, reaction temperatures, treatment times and quantities of acid. Perchloric acid or other peroxy halogen acids may be used to treat the starting materials, in the presence or absence of ozone, at temperatures between 70° and 95° C, although the ozone treatment, when effected after removal of the manganese dioxide from the initial peracid treatment, is preferably carried out between 50° and 80° C.

By contrast with the convention processes described above for the recovery of synthetic magnesium dioxide, the instant process operates with a stronger oxidizing medium and it is indeed surprising that disproportionation can be carried out with such stronger oxidizing acids and yet is capable of providing the yield which is significantly higher than would otherwise be expected. The result is most noticeable with the use of perchloric acid. According to the normal disproportionation concept, for each mole of $Mn_2O_3$ one would expect only one mole of manganese dioxide. When the perchloric acid has a concentration between 20% and 50%, consistently higher yields of $MnO_2$ are obtained. The higher yield when perchloric acid is used can apparently be explained by the relationship:

$$(3)\ Mn^{++} \longrightarrow Mn^{++++} \longrightarrow MnO_2$$

A portion of the disproportionated manganese is oxidized by the perchloride ion. This oxidation appears to take place only in the presence of freshly disproportionated trivalent manganese in a nascent state. This is remarkable since prolonged boiling of $Mn(ClO_4)_2$ solution enriched with perchloric acid does not show any precipitation of manganese dioxide.

Operations in accordance with the present invention yield manganese dioxide with a predominantly gamma structure which is particularly desirable for use in batteries.

Apparently the high oxidation potential of the perchloric acid plays an important role (see G. F. Smith, Talanta: 1968, Vol. 18. S. 489/496). The perchloric acid monohydrate, which corresponds to concentration of about 85% perchloric acid, has for example a potential of +2.1 volts. The Redox potential of manganese$^{++}$/manganese $^{++++}$ is +1.28 volts in acid solution.

When the reaction is carried out so that the manganese dioxide first formed is removed, the remaining weak acid, which may have a slight pink coloration, characteritic of manganous perchlorate, is heated to 60° to 80° C and treated with ozone by bubbling it into the solution. There immediately results a dark coloration which represents the precipitation of manganese dioxide. As the manganese dioxide continues to precipitate, the solution becomes more and more acid until, with the end of precipitation of manganese dioxide, the product is found to be free perchloric acid. This perchloric acid can be used for further treatment of low valent manganese oxides as described above. It is important to note that the manganese dioxide produced in this fashion has a gamma structure also. These results appear to contradict the teachings of: *Gmelin Band Sauerstoff*, 8 Aufl, Lieferung 4, Seite 1181, which indicates that oxidation of divalent manganese with ozone produces permanganate ion. The use of the perchloric acid, therefore, seems to modify the expected results with ozone oxidation.

The proportionation and ozone treatment can be effected in a single step. The $Mn_2O_3$ or manganese ore subjected to reductions to manganese oxide is pulverized and slurried with 20% perchloric acid. Surprisingly, the reaction can be effected with less than an equivalent amount of perchloric acid.

The slurry is then heated to about 60° C and is treated with ozone as described above. Deproportionation produces a part of the manganese dioxide while ozone produces a further part, regenerating the acid in the process. The effects continue until substantially all of the starting material is transformed into the manganese oxide. The latter is then filtered, washed and dried. The filtrate, i.e. perchloric acid, can be used to react a fresh charge of the trivalent manganese oxide. It is only necessary to replace the portion of perchloric acid which is consumed by oxidation.

The reaction may be carried out with a treatment time of one to ten hours with strong agitation. The peroxy acid can be recovered by distillation since a 72% perchloric acid azeotrope distills at 203° C. This permits residual acid to be recovered from the manganese dioxide easily without loss of acid. The peroxy halogen acid may be used in concentrations of 20 to 40% which are easy to handle and the ozone can be readily generated by electrical ozonators.

SPECIFIC EXAMPLES

EXAMPLE I 330 g of $Mn_2O_3$ were treated at about 40° C with a 20% solution by weight of perchloric acid. After stirring, the reaction mixture was heated to 90° C and the temperature was maintained there for an hour.

Subsequently, the resulting, deeply dark product was filtered off, washed free of cations and anions and dried at 60° C in a vacuum dryer. From the starting mixture, 265 g of $MnO_2$ were recovered which corresponds to a 30% higher product yield than according to theory.

EXAMPLE II

A 20% manganese perchlorate solution by volume was heated to 50° C. Subsequently, one allows ozone to bubble through the solution. The solution itself attained a dark color almost instantly. The manganese dioxide product was filtered away, washed free from acid, and dried at 90° C. From the starting mixture, 50 g of $Mn(ClO_4)_2$ $H_2O$ and 15 g of $MnO_2$ result. That amounts to about 95% of the predicted product.

We claim:
1. A method for the preparation of manganese dioxide which comprises:
    a. treating a manganese (III)-containing oxide with an acid perhalo solution and simultaneously with ozone to effect disproportionation of the manganese oxide thereby yielding manganese (II) ion in solution and manganese dioxide as a precipitate therein; and
    b. removing the manganese dioxide precipitate from the manganese (II) solution of step (a).
2. The method defined in claim 1, step (a) wherein the perhalo is selected from the group consisting of perchloro, perbromo, periodo and mixtures thereof.
3. The method defined in claim 1 wherein the perhalo acid has a concentration of from 10 to 40% by weight.
4. The method defined in claim 1 wherein the acid perhalo is perchloric acid.
5. The method defined in claim 1, wherein in step (a) a cation with a greater ionic radius than Mn (IV) is added to the perhalo acid in order to favor the production of $\alpha$ manganese dioxide over $\gamma$ manganese dioxide.
6. The method defined in claim 1 wherein said solution is a solution of an alkali metal or ammonium perhalate and an acid.
7. The method defined in claim 1 wherein said solution is treated with ozone subsequent to step (b) after the addition of manganese (II).

* * * * *